US008280771B2

US 8,280,771 B2
\*Oct. 2, 2012

(12) United States Patent
Hendrickson et al.

(10) Patent No.:
(45) Date of Patent:

(54) ADVERTISING THAT IS RELEVANT TO A PERSON

(75) Inventors: Gregory L. Hendrickson, Seattle, WA (US); James T. Reichert, Kirkland, WA (US); Jonathan C. Cluts, Sammamish, WA (US); Pamela J. Heath, Seattle, WA (US); Sven Pleyer, Woodinville, WA (US); David W. Baumert, Sammamish, WA (US); John P. Gallagher, Fall City, WA (US); Wistar D. Rinearson, Redmond, WA (US); Flora P. Goldthwaite, Seattle, WA (US)

(73) Assignee: Microsoft Corporation, Redmond, WA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/349,673

(22) Filed: Jan. 13, 2012

(65) Prior Publication Data

US 2012/0116888 A1    May 10, 2012

Related U.S. Application Data

(63) Continuation of application No. 11/337,738, filed on Jan. 23, 2006, now Pat. No. 8,126,774.

(51) Int. Cl.
*G06K 9/00* (2006.01)
*G06F 3/00* (2006.01)
*G06F 17/60* (2006.01)

(52) U.S. Cl. ............... 705/14.58; 705/14.55; 705/14.57; 705/14.73

(58) Field of Classification Search ............... 705/14, 705/14.4, 14.54; 345/862; 382/100
See application file for complete search history.

(56) References Cited

U.S. PATENT DOCUMENTS

| | | | |
|---|---|---|---|
| 5,708,478 A | 1/1998 | Tognazzini | |
| 5,848,396 A | 12/1998 | Gerace | |
| 6,009,410 A \* | 12/1999 | LeMole et al. | 705/14.54 |
| 6,036,601 A | 3/2000 | Heckel | |
| 6,301,619 B1 | 10/2001 | Segman | |
| 6,329,994 B1 | 12/2001 | Gever et al. | |
| 6,343,274 B1 | 1/2002 | McCollom et al. | |
| 6,571,279 B1 | 5/2003 | Herz et al. | |
| 6,698,020 B1 | 2/2004 | Zigmond et al. | |
| 6,725,203 B1 | 4/2004 | Seet et al. | |
| 6,738,978 B1 | 5/2004 | Hendricks et al. | |
| 6,954,728 B1 \* | 10/2005 | Kusumoto et al. | 705/14.4 |
| 6,978,470 B2 | 12/2005 | Swix et al. | |
| 7,062,469 B2 | 6/2006 | Meyers et al. | |
| 7,149,704 B2 | 12/2006 | Martin et al. | |

(Continued)

OTHER PUBLICATIONS

U.S. Appl. No. 11/337,738, Notice of Allowance mailed Nov. 8, 2011, 8 pages.

(Continued)

*Primary Examiner* — Saba Dagnew
*Assistant Examiner* — Marilyn G Macasiano

(57) ABSTRACT

A person is viewing a display. By evaluating tracked information about the person, the display and/or the content being viewed, a tracking system determines that an opportunity exists to present an advertisement that is relevant to the person in the context of the person currently viewing the display. The tracking system provides advertiser data for the advertisement and instructions for generating the advertisement to a synthesis system local to the viewer and the viewer's display system, which dynamically synthesizes the advertisement and provides it to the display.

20 Claims, 9 Drawing Sheets

U.S. PATENT DOCUMENTS

| | | | |
|---|---|---|---|
| 7,210,104 | B2 | 4/2007 | Nakagawa et al. |
| 2002/0046102 | A1* | 4/2002 | Dohring et al. ............... 705/14 |
| 2002/0082923 | A1 | 6/2002 | Merriman et al. |
| 2002/0144263 | A1 | 10/2002 | Eldering et al. |
| 2002/0171691 | A1* | 11/2002 | Currans et al. ............... 345/864 |
| 2003/0028565 | A1 | 2/2003 | Landsman et al. |
| 2003/0053420 | A1 | 3/2003 | Duckett et al. |
| 2003/0065805 | A1 | 4/2003 | Barnes, Jr. |
| 2003/0103644 | A1* | 6/2003 | Klayh ............... 382/100 |
| 2003/0220835 | A1 | 11/2003 | Barnes, Jr. |
| 2004/0073453 | A1 | 4/2004 | Nenov et al. |
| 2004/0078809 | A1 | 4/2004 | Drazin |
| 2004/0260767 | A1 | 12/2004 | Kedem et al. |
| 2006/0206379 | A1 | 9/2006 | Rosenberg |
| 2007/0024580 | A1 | 2/2007 | Sands et al. |

OTHER PUBLICATIONS

U.S. Appl. No. 11/337,738, Amendment filed Aug. 25, 2011, 13 pages.

U.S. Appl. No. 11/337,738, Non-Final Rejection mailed Jun. 9, 2011, 19 pages.

U.S. Appl. No. 11/337,738, Amendment filed Mar. 21, 2011, 12 pages.

U.S. Appl. No. 11/337,738, Non-Final Rejection mailed Dec. 23, 2010, 19 pages.

U.S. Appl. No. 11/337,738, Amendment After Final Rejection filed Nov. 9, 2010, 15 pages.

U.S. Appl. No. 11/337,738, Final Rejection mailed Aug. 19, 2010, 16 pages.

U.S. Appl. No. 11/337,738, Amendment filed Jun. 17, 2010, 13 pages.

U.S. Appl. No. 11/337,738, Non-Final Rejection mailed Mar. 18, 2010, 17 pages.

U.S. Appl. No. 11/337,738, Amendment After Final Rejection filed Feb. 22, 2010, 12 pages.

U.S. Appl. No. 11/337,738, Final Rejection mailed Dec. 9, 2009, 18 pages.

U.S. Appl. No. 11/337,738, Amendment filed Aug. 6, 2009, 14 pages.

U.S. Appl. No. 11/337,738, Non-Final Rejection mailed May 28, 2009, 16 pages.

U.S. Appl. No. 11/337,738, Amendment filed Feb. 3, 2009, 16 pages.

U.S. Appl. No. 11/337,738, Non-Final rejection mailed Nov. 3, 2008, 15 pages.

"Increasing Revenue Through Dynamic Advertising Insertion", Bearingpoint Institute for Executive Insight; Point of View: Commercial Services; BEARINGPOINTINSTITUTE.COM, copyright 2005, 9 pages.

"Wireless marketing and advertising solutions", http://www.memsen.com/datavendor_desc.htm, viewed on Oct. 20, 2005, 3 pages.

Linden, Greg, "Geeking with Greg: Personalized advertising on Findory", http://glinden.blogspol.coml2005/05/personalized-advertising-on-findory.html, published May 30, 2005, 7 pages.

Symcor enables The bay & Zellers to deliver their customer credit card statements via the web, Canada Newswire Oct. 24, 2001, p. 1.

* cited by examiner

ADVERTISING THAT IS RELEVANT TO A PERSON

CROSS-REFERENCE TO RELATED APPLICATIONS

This application claims priority to and is a continuation of co-pending U.S. patent application Ser. No. 11/337,738 entitled "Advertising that is Relevant to a Person" and filed Jan. 23, 2006, which is incorporated herein by reference.

BACKGROUND

Conventional broadcast television advertising models developed during the 1950's and 1960's are threatened by numerous forces in today's broadcast market. Costly, pre-produced commercials are today seen by ever fewer people as viewers disperse across a broad range of choices, channels and networks. Additionally, new technologies such as digital video recorders, also known as personal video recorders or digital personal video recorders, enable viewers to skip commercials altogether. Techniques for the targeting of advertisements are meager allowing rough targeting based only on the content of the media, the demographics of the audience of a particular television show, or the demographics of residents in an area having a particular zip code.

Some industry experts question how long the old world approach can last before the entire system becomes impossible to justify.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A person is viewing a display. By evaluating tracked information about the person, the display and/or the content being viewed, a tracking system determines that an opportunity exists to present an advertisement that is relevant to the person in the context of the person currently viewing the display.

The tracking system provides advertiser data for the advertisement and instructions for generating the advertisement to a synthesis system local to the viewer and the viewer's display system, which dynamically synthesizes the advertisement and provides it to the display.

The tracking system may also generate additional data for the advertisement. The additional data may be based on information that is not accessible by the advertiser or that the advertiser is unable to correlate to the advertisement. This additional data may target and/or personalize the advertisement without compromising the person's privacy.

While the tracking system may notify an advertiser of the opportunity and request advertiser data, the advertiser is not aware to which person the advertisement is going to be presented, and therefore cannot personalize the advertisement at its end.

The synthesis system may include a three-dimensional (3D) rendering engine, and the advertiser data (and possibly also the additional data) may be data from which at least one three-dimensional (3D) object can be rendered. Such data is generally far less expensive to create, requires less storage space and can be transmitted more quickly than pre-produced elements.

The advertiser data may include pre-produced elements. For example, the advertisement may be a complex advertisement with pre-produced video incorporated as an animated texture map into a 3D object.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments of the invention. However it will be understood by those of ordinary skill in the art that the embodiments may be practiced without these specific details. In other instances, well-known methods, procedures and components have not been described in detail so as not to obscure the embodiments of the invention.

Described below is a new approach to advertising where opportunities to present advertisements that are relevant to a particular person are based on multiple contexts including the identity of the particular person. Those advertisements are generated dynamically in real-time for display to that particular person. The advertisements are filtered and scaled in context and presented to the person currently viewing a display.

A person may be willing to let a tracking system collect, monitor and evaluate tracked information about multiple contexts, including, for example, the person, the content being viewed on the display and logistical information about the display and its environment. The tracking system may be located inside the person's home or at some other trusted location, so that the personal information stored therein is protected. The tracking system will then evaluate the tracked information to determine the opportunities to present relevant advertisements.

The advertisement may be composed from data that originates with the advertiser and additional data that is based on information that is not accessible by the advertiser or that the advertiser is unable to correlate to the advertisement. The additional data targets and/or personalizes the advertisement without releasing personal information about the person to the advertiser.

The advertisement may include rendered three-dimensional (3D) objects. The data that originates with the advertiser may be instructions on how to render these objects.

Figure 1:
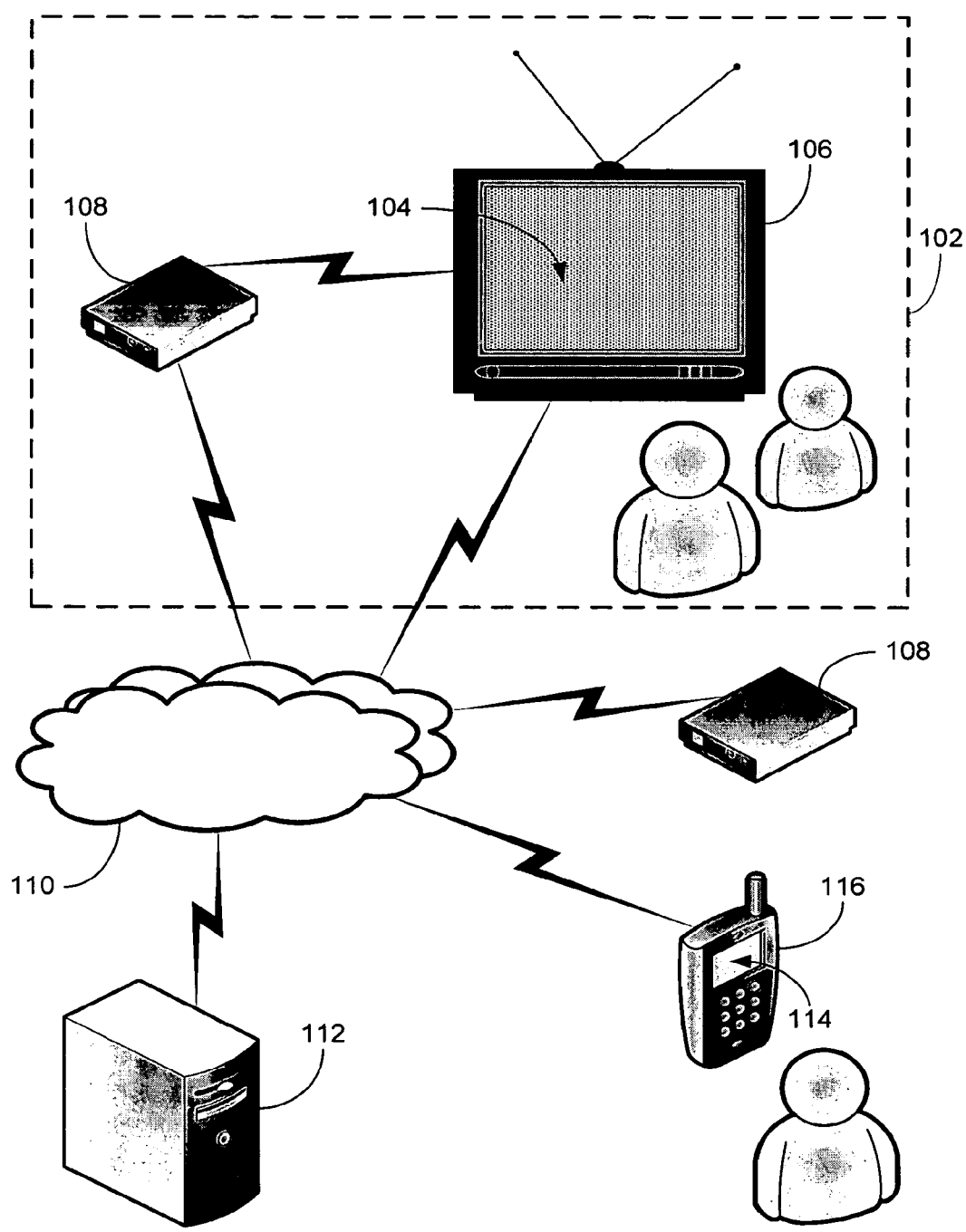
FIG. 1 is a schematic diagram of an exemplary advertising system.

FIG. 1 is a schematic diagram of an exemplary advertising system. In a premises 102, one or more persons are viewing a display 104 of a device 106. A non-exhaustive list of examples for device 106 includes a television set, a cellular telephone, a smart phone, a personal digital assistant (PDA), a monitor of a computer, a computer with an integrated display, a home-entertainment hub, an ambient information display system (e.g. projections, etc.) and the like.

Device 106 receives media content from one or more sources. A non-exhaustive list of examples for the sources of media content include satellite communications via a satellite dish and receiver; cable communications via a head-end, cables and a set-top box; Internet communications via an Internet Service Provider (ISP) and modem; a wide-area wireless network provider (e.g. phone carrier) and a radio receiver; a local-area wireless network provider (e.g. hotel, apartment, university) and a radio receiver; and the like.

Regardless of the source, media content received by device 106 passes through or is accessible by one or more devices 108. One of devices 108 may be integrated into device 106. One or more of devices 108 may be coupled to device 106 via any combination of wired, wireless or other suitable connections, possibly via one or more networks 110. If not integrated into device 106, device 108 is not necessarily located inside premises 102 but is preferably in a trusted environment.

The person may also have another device 116 with a display 114 that is able to be viewed by the person inside and outside premises 102. A non-exhaustive list of examples for device 116 includes a cellular telephone, a smart phone, a PDA, a portable computer, an automotive entertainment and telematics system, and the like. Device 116 may receive media content from at least one source, and this media content passes through or is accessible by one or more of devices 108. One of devices 108 may be integrated into device 116. One or more of devices 108 may be coupled to device 116.

Figure 2:
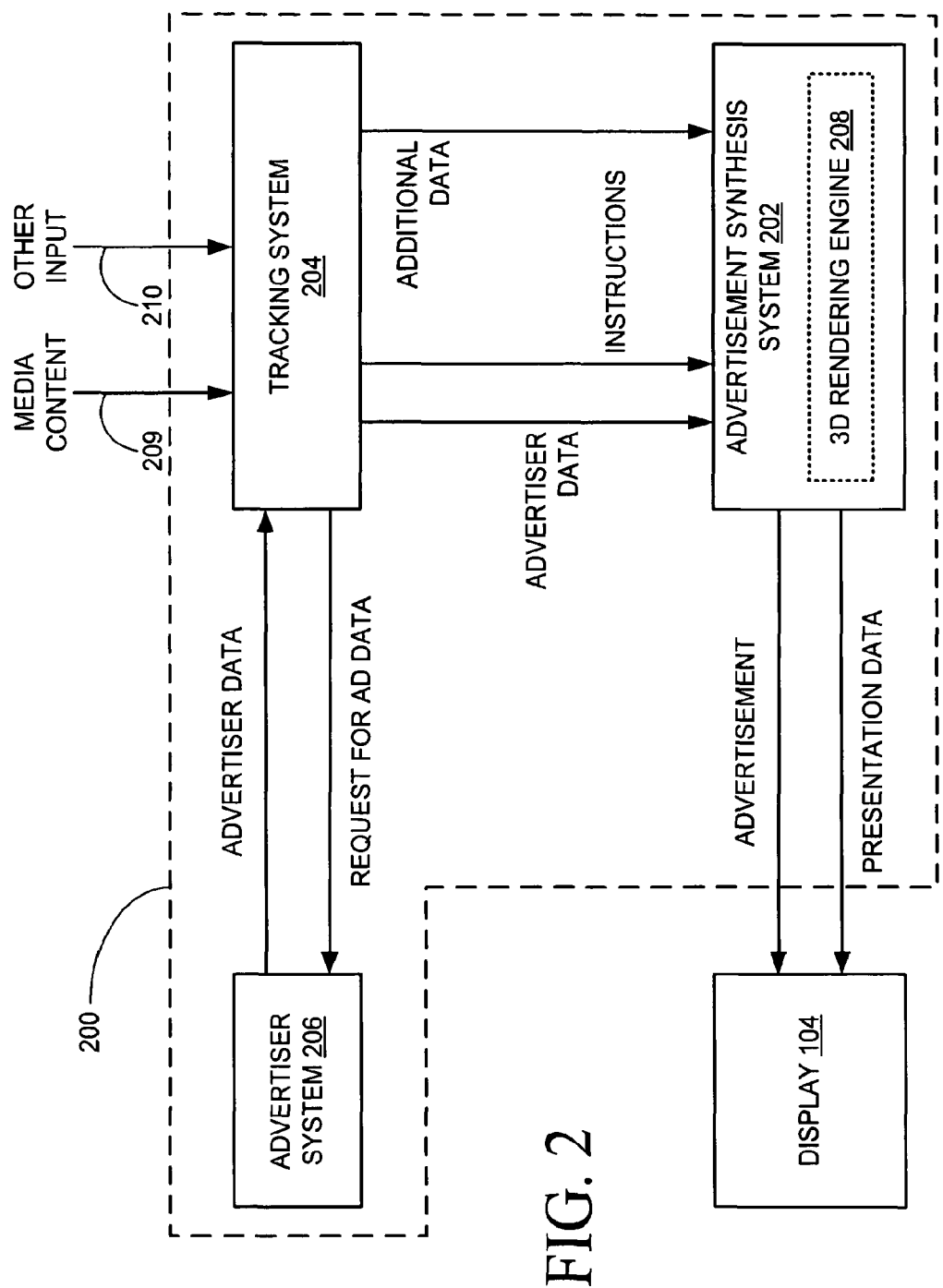
FIG. 2 is a block diagram of an exemplary advertising system.

FIG. 2 is a block diagram of an exemplary advertising system. A system 200 comprises an advertisement synthesis system 202 coupled to display 104, a tracking system 204 coupled to synthesis system 202, and an advertiser system 206 coupled to tracking system 204.

Tracking system 204 receives as input media content (indicated by arrow 209) and other input (indicated by arrow 210). As explained below, tracking system 204 receives advertiser data from advertiser system 206, either in advance or in response to a request for such advertiser data. Tracking system 204 generates additional data and determines instructions for generating the advertisement in a manner that is configured for imminent presentation in display 104. Tracking system 204 provides the advertiser data, additional data and instructions to synthesis system 202. Synthesis system 202 builds the advertisement and provides it along with presentation control data to display 104.

In one embodiment, device 108 comprises tracking system 204 and synthesis system 202, and device 108 is integrated into device 106.

In another embodiment, device 108 comprises tracking system 204 and synthesis system 202, and device 108 is coupled to device 106.

In yet another embodiment, device 106 comprises display 104 and synthesis system 202, and device 108, whether integrated into device 106 or coupled thereto, comprises tracking system 204.

Advertiser system 206 may be implemented in a server 112 that is coupled to at least one of one or more networks 110. Advertiser system 206 may be operated by or on behalf of a business, a public relations firm, an advertising agency, a content provider, a public service organization, a government agency, or any other suitable organization. Advertiser system 206 may comprise a repository of advertiser data.

Figure 3:
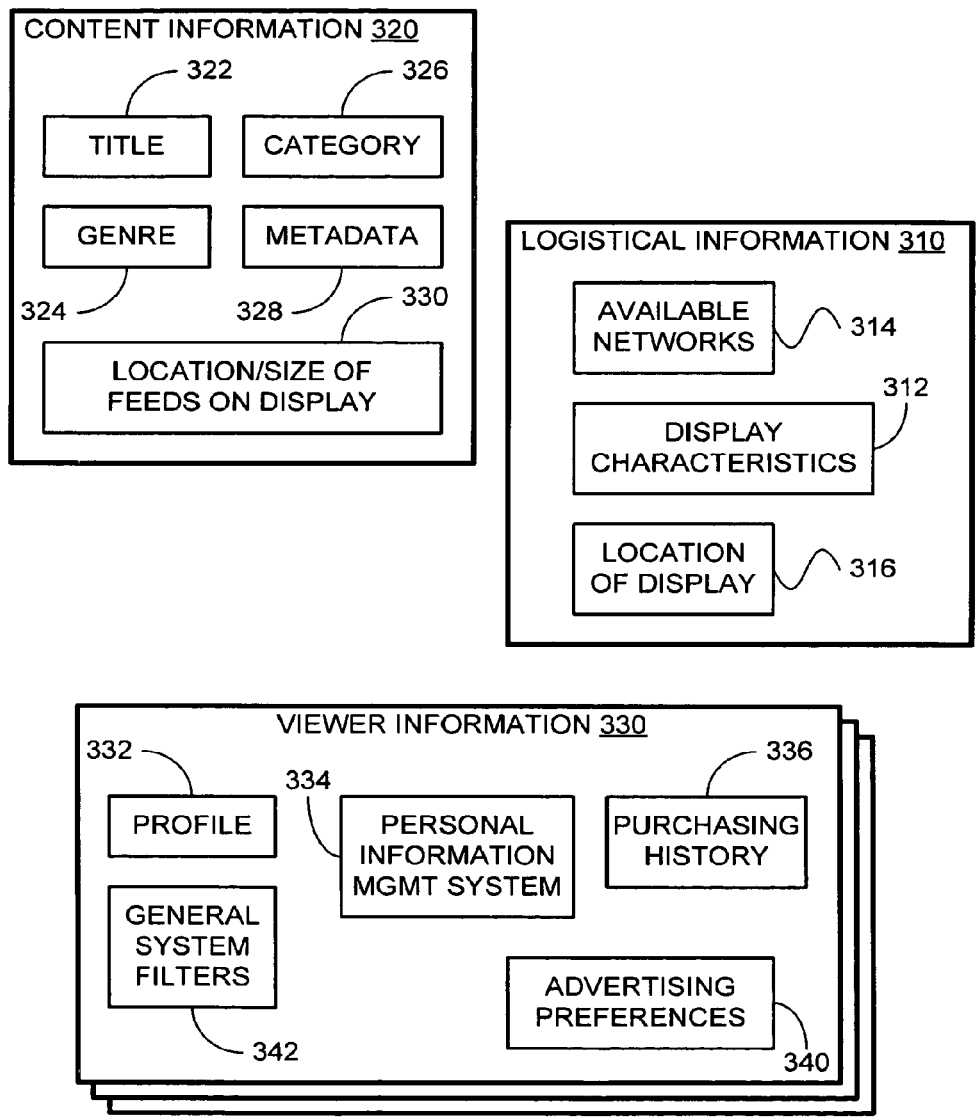
FIG. 3 is a block diagram of exemplary information collected, monitored and evaluated by a tracking system.

FIG. 3 is a block diagram of exemplary information collected, monitored and evaluated by a tracking system. Tracking system 204 may collect, monitor and evaluate various types of information, including, for example, logistical information 310, content information 320 and viewer information 330. At least some of content information 320 is gleaned from the media content input to tracking system 204. Logistical information 310 and viewer information 330 are exemplary types of other input received by tracking system 204. This collection and monitoring may be ongoing, independent of whether anyone is currently viewing the display.

Logistical information 310 may include characteristics 312 of display 104 (114), for example, its size, resolution, color, depth, polychromatic/monochromatic screen, and the like. Logistical information 310 may include information 314 on networks available to tracking system 204. Tracking system 204 uses this information to know which networks are available to it to reach advertiser system 206. Logistical information 310 may include location information 316 regarding device 106 (116). For example, if device 106 (116) includes a global positioning system (GPS) receiver, it can assess its location and share that with tracking system 204. Logistical information 310 may also include ambient sensor data regarding device 106 (116). The ambient sensor data may include, for example, light and sound levels, motion, and other data from the user's environment that help establish context.

Content information 320 may include, for example, any of the following information regarding media content currently being viewed by the person on display 104 (114): title 322, genre 324, category 326, and any other suitable metadata 328 of the media content. Content information 320 may also include the placement and/or size of the particular media feed(s) on display 104 (114).

Tracking system 204 may store viewer information 330 for one or more persons. For example, if used in a home setting, tracking system 204 may store viewer information 330 for different members of the family. If used in a purely individual setting, tracking system 204 may store viewer information 330 for one person. Viewer information 330 may include, for example, a) a profile 332 of the person, which may include, for example, the person's interests and hobbies, the person's sex, age, locale, profession, subscriptions and memberships, ethnicity, marital status, personal characteristics such as parent, pet owner, very tall or short, and the like;

b) a personal information management system 334 for the person, which may include, for example, the person's address book (list of contacts), calendar, mail and/or message store, a task list, notes and the like;

c) a purchasing history 336 of the person;

d) the person's advertising preferences 340, which may include, for example, a record of which advertisements the person has interacted with in the past, and/or a record of which advertisements the person has immediately dismissed, if such a capability to dismiss exists, search terms the person has used, media consumption (viewing and listening) history, a preferred look and feel for advertisements, and the like; and e) general system filters 342 configured by or on behalf of the person. For example, in a family setting, parents may configure tracking system 204 not to present any advertisements to children.

Figure 4:
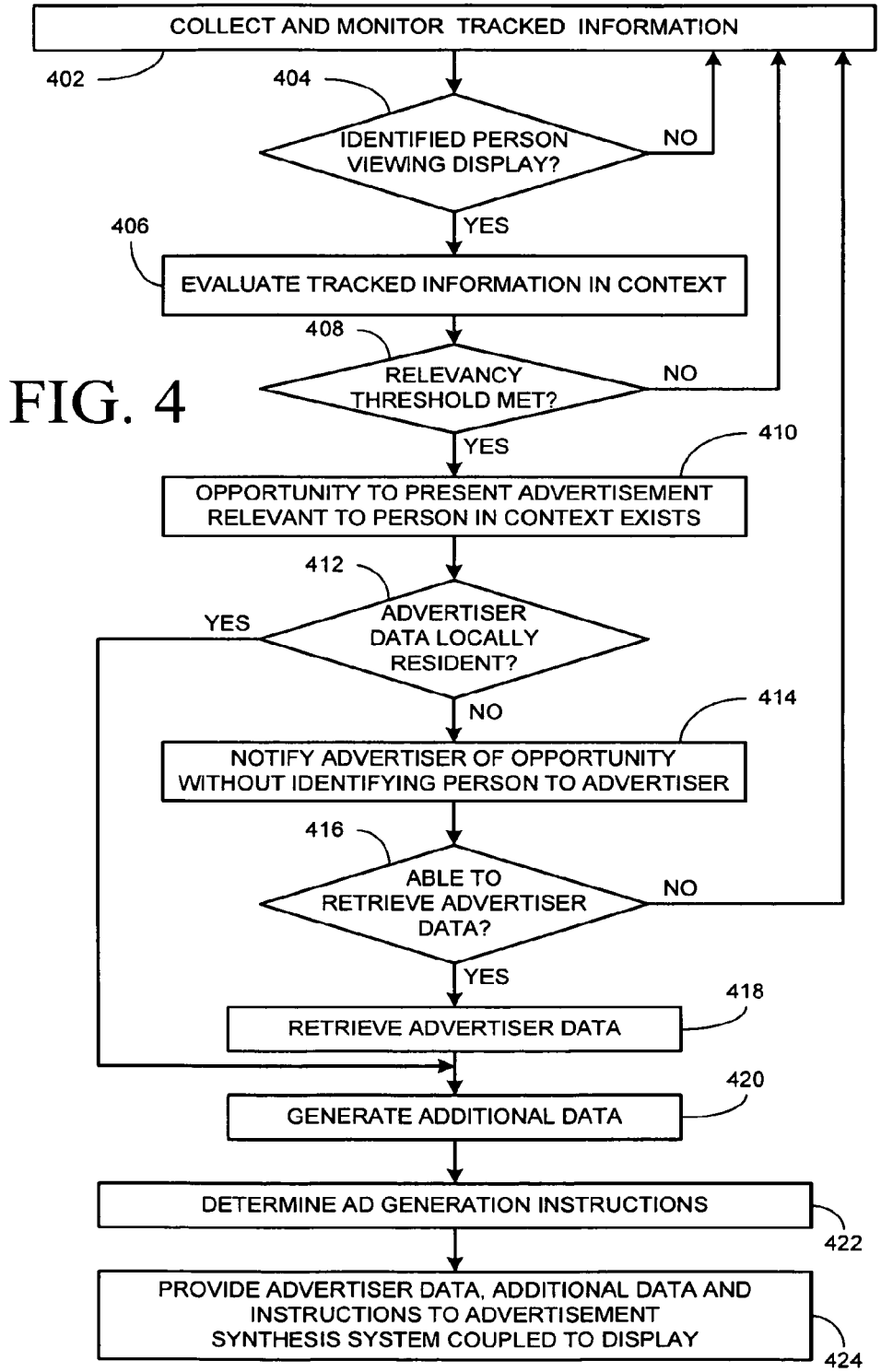
FIG. 4 is a flowchart of an exemplary method for advertising.

FIG. 4 is a flowchart of an exemplary method for advertising to be implemented by tracking system 204. For example, tracking system 204 may implement the method using hardware, software, firmware, or any suitable combination thereof.

At 402, tracking system 204 collects and monitors tracked information. The tracked information may include, for example, any or a combination of logistical information 310, content information 320 and viewer data 330.

At 404, tracking system 204 checks whether it has received an identification of a person currently viewing display 104 (114). If not, then the method resumes from 402. This identification may be done in any number of ways. For example, a biometric sensor in device 106 (116) or a remote control or other accessory of device 106 (116) may identify the person. In another example, the person may log onto device 106 (116) and/or device 108, thus providing identification. In yet another example, cameras or other sensors may detect and identify the person. In yet another example, the device having the display may be used solely by the person, so any use of the device may imply that the person is viewing the display.

If tracking system 204 has received an identification of the person currently viewing display 104 (114), then at 406 tracking system 204 evaluates the tracked information corresponding to that person and to the context of the person viewing currently viewing display 104 (114). The evaluation may be performed by weighting different factors in the tracked information, assessing a relevancy function in the weighted factors, and setting a relevancy threshold that, when met (checked at 408), triggers tracking system 204. The relative weights and relevancy threshold may be configured as part of the general system filters 342.

If the relevancy threshold is not met, the method resumes from 402. If the relevancy threshold is met, this means that an opportunity to present an advertisement that is relevant to the person in the context of the person viewing the display exists, as indicated at 410.

Tracking system 204 then checks at 412 whether advertiser data for such an advertisement is resident locally in device 108. If not, tracking system 204 then notifies advertiser system 206 at 414 of the opportunity, without identifying the person to advertiser system 206. If tracking system 204 is unable to retrieve advertiser data from advertiser system 206 (checked at 416), the method resumes from 402. Otherwise, at 418 tracking system 204 retrieves the advertiser data for the advertisement from advertiser system 206.

If tracking system 204 already has advertiser data or retrieves it, then the opportunity can be realized. At 420, tracking system 204 generates additional data for the advertisement. This data is generated based on information that is not accessible by advertiser system 206 or that advertiser system 206 is unable to correlate to the advertisement.

At 422, tracking system 204 determines instructions for generating the advertisement in a manner that is configured for imminent presentation in display 104 (114), and at 424, the advertiser data, the additional data, and the instructions are provided to synthesis system 202. Some of the instructions may have originated at advertiser system 206 and may relate to how the advertisement is to be presented, including how the advertisement looks, sounds and behaves. For example, an advertiser may specify a minimum size for an advertisement or may provide different sets of advertiser data for different types of displays.

When determining the instructions, tracking system 204 may take into account how much space is available in display 104 (114) for the advertisement. This will depend both on logistical information (for example, the size of display 104 (114)) and content information (for example, the placement and/or size of the particular media feed(s) currently being presented on display 104 (114)).

The instructions determined by tracking system 204 may specify how long the advertisement is to persist, how loud it is to play relative to other feeds on the display, how much motion the advertisement is to have, how much of the resources of synthesis system 202 can be used to synthesize the advertisement, and the like.

The advertiser data may include pre-produced elements for inclusion in the advertisement. A non-exhaustive list of examples for pre-produced elements includes audio, video, text, animations, data sets, and the like.

Synthesis system 202 may comprise a 3D rendering engine 208. The advertiser data and/or additional data may include data that is used by 3D rendering engine 208 to build, composite and animate a 3D advertisement dynamically. The style and look of the resulting advertisement may depend on several factors, including, for example, the context, the capabilities of 3D rendering engine 208, the context and the advertising preferences of the targeted viewer. For example, some rendered advertisements may be photorealistic, while others may be cartoon-like.

A 3D advertisement rendered dynamically by synthesis system 202 may also have pre-produced elements embedded therein.

The additional data generated by tracking system 204 may personalize the advertisement to the person currently viewing the display.

Specific examples of advertiser data, additional data and instructions are described below with respect to FIGS. 5, 6, 7 and 8.

Figure 5:
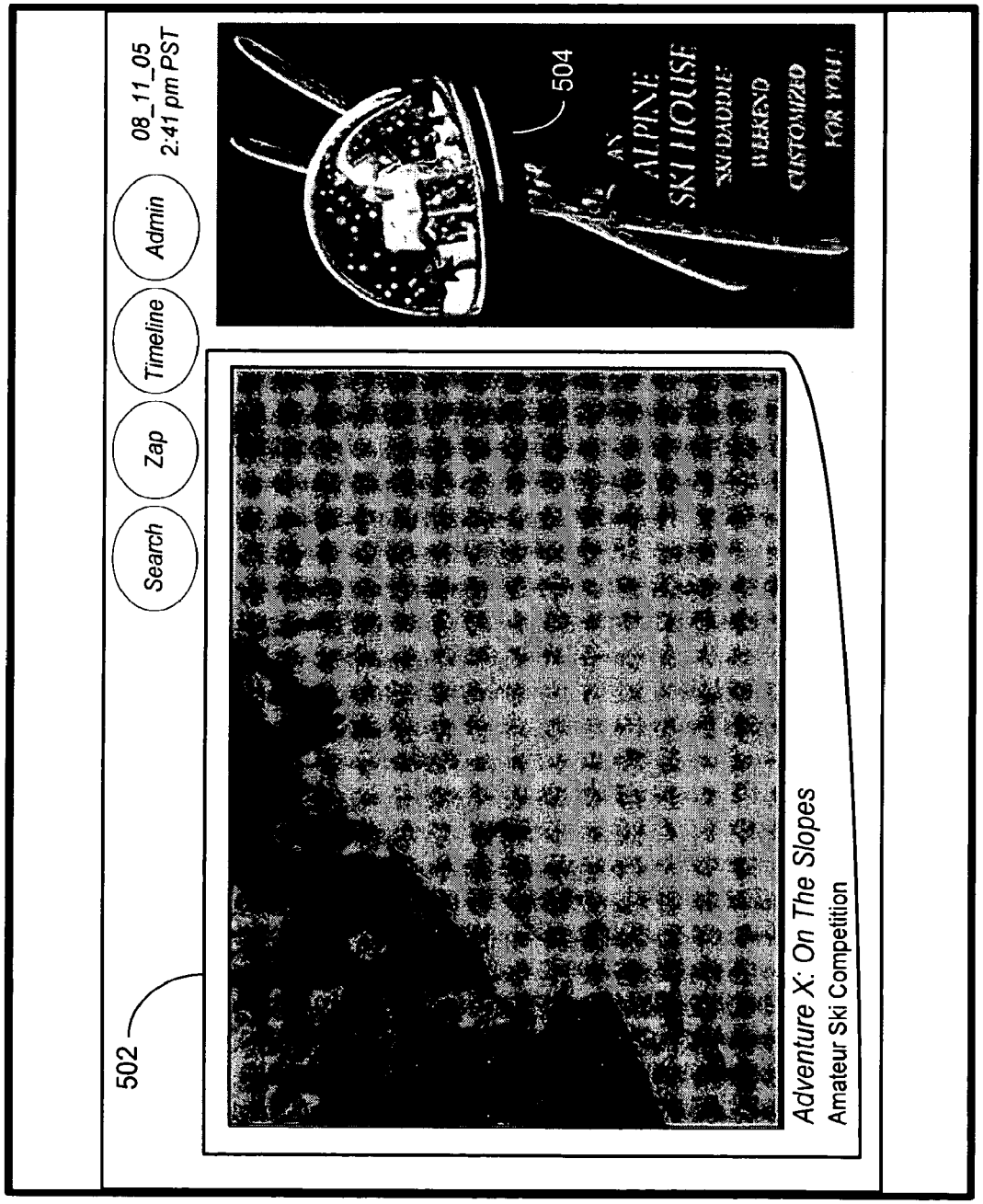
FIG. 5 is an illustration of an example view of a display.

FIG. 5 is an illustration of an example view of a display. The display has a multiple picture-in-picture (PiP) environment, which is a layout in which the viewer can have multiple panes of content open and/or playing at the same time. The viewer is free to jump around or change focus as desired. A pane 502 contains the main in-focus feed—a televised downhill ski competition.

A 3D object 504 is an advertisement promoting a weekend getaway offer, rendered by synthesis system 202. In this example, tracking system 204 has been triggered to present this advertisement because the weighted combination of the following tracked information monitored by tracking system 204 has been evaluated and found to exceed the relevancy threshold: (a) the person viewing the display has listed skiing as an interest or hobby (in profile 332), (b) the person is watching media content that involves downhill skiing, (c) at some point in the past (as recorded in purchasing history 336) the person stayed at an area ski lodge, possibly even the Alpine Ski House that is being advertised. 3D object 504 may be interactive. For example, focusing on and selecting the snow globe may link to a website or some other type of sales media, or may cause a more detailed advertisement to be rendered by synthesis system 202 and presented in the display.

The more information made available to tracking system 204, the more targeted and/or personalized the advertising experience can be. For example, if, when requesting advertiser data from advertiser system 206, tracking system 204 notifies advertiser system 206 that the person is a vegetarian (as stored in profile 332), advertiser system 206 may compile an offer that includes a vegetarian meal plan.

Figure 6:
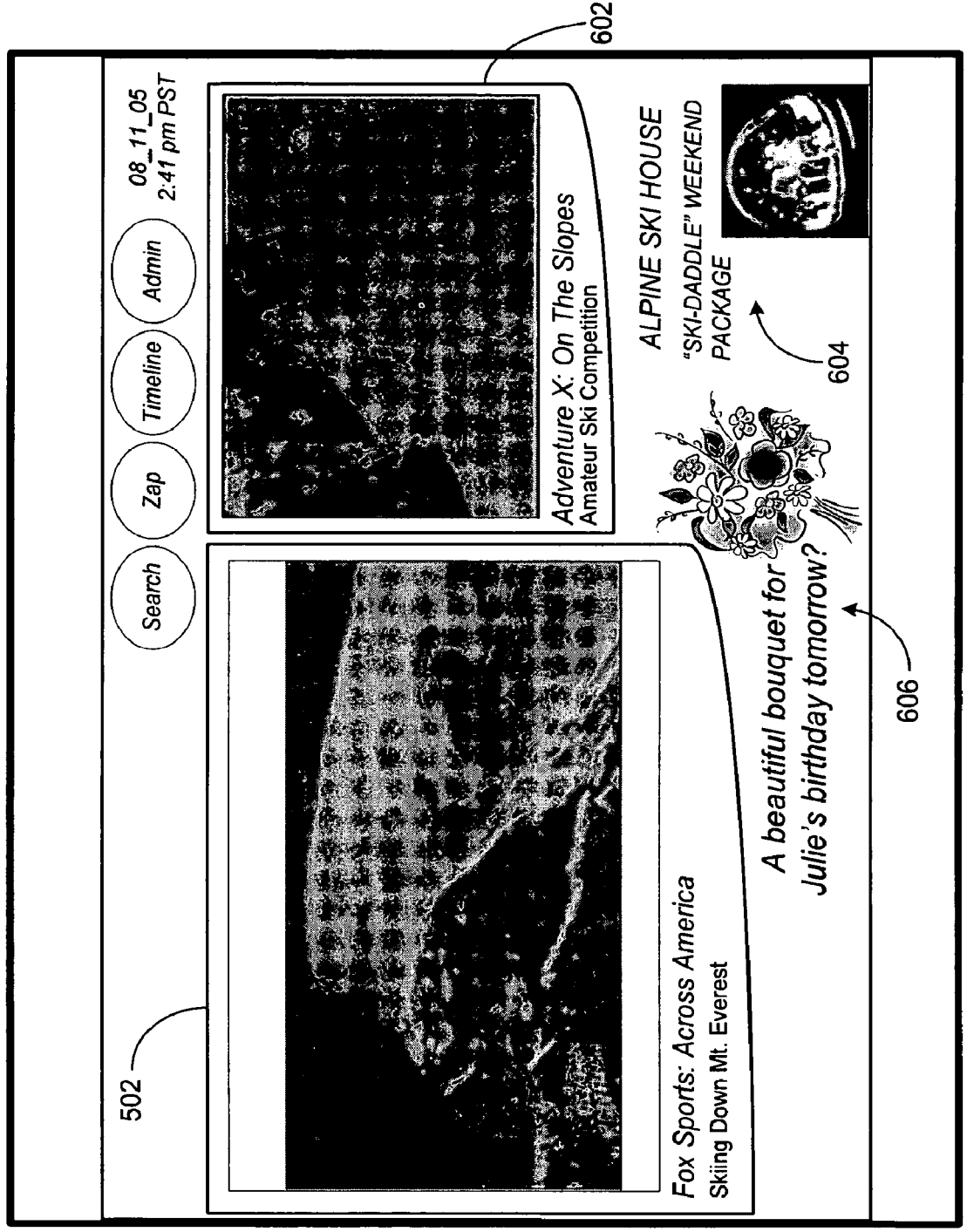
FIG. 6 is an illustration of another example view of the display of FIG. 5.

FIG. 6 is an illustration of another example view of the display of FIG. 5. Pane 502 now contains a different main in-focus feed—a ski event broadcast through the Internet. The televised downhill ski competition is in a smaller pane 602. Since more of the display is dedicated to media content, less space is available for the presentation of advertisements. A 3D object 604 is a smaller version of the advertisement promoting the weekend getaway offer.

Another 3D object 606 is an advertisement for flowers. The advertisement was generated from advertiser data that instructs synthesis system 202 how to create a photorealistic bouquet. Tracking system 204 has generated additional data that personalizes the advertisement with the message "A beautiful bouquet for Julie's birthday tomorrow?" and instructions that synthesis system 202 uses to animate the bouquet and the message. In this example, tracking system 204 has been triggered to present this advertisement because the weighted combination of the following tracked information monitored by tracking system 204 has been evaluated and found to exceed the relevancy threshold: (a) tomorrow is Julie's birthday, which is noted in the calendar of the person viewing the display, (b) flowers were sent on previous birthdays according to the person's purchase history, and (c) the tracking system 204 stores a frequent-customer virtual punch-card. Even though this advertisement is unrelated to with the media content being watched, the weighted combination of the tracked information is sufficiently high to trigger tracking system 204.

Figure 7:
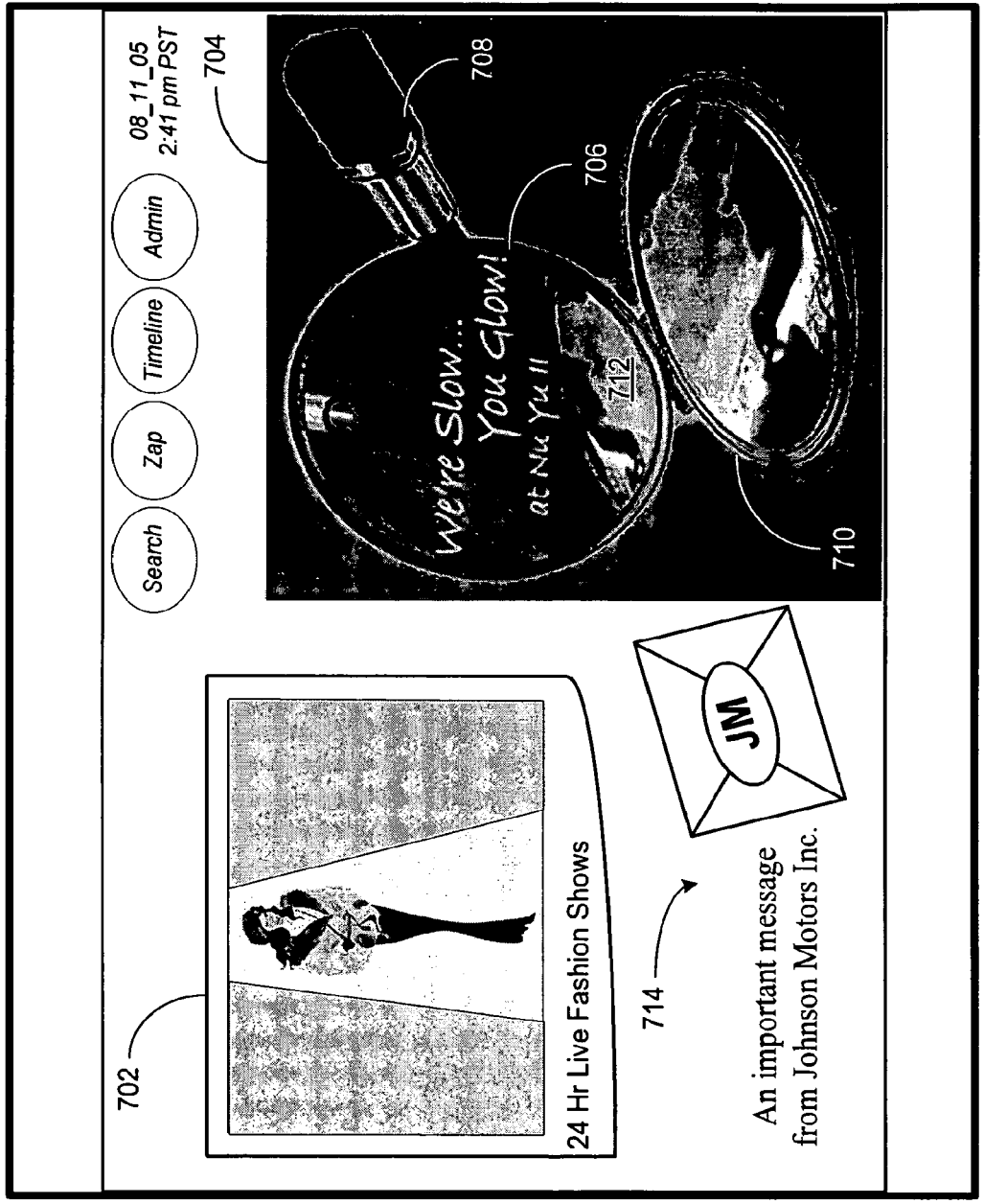
FIG. 7 is an illustration of a further example view of a display.

FIG. 7 is an illustration of a further example view of a display. In this example, the display is being watched by a teenaged girl and her father. As with FIGS. 5 and 6, the display has a multiple picture-in-picture (PiP) environment. A pane 702 contains a main in-focus feed—a televised fashion show. A 3D object 704 is a time-sensitive advertisement from a local business. Tracking system 204 has been triggered to present this advertisement because the weighted combination of the following tracked information monitored by tracking system 204 has been evaluated and found to exceed the relevancy threshold: (a) the teenaged girl has received services from this business in the past (as recorded in her purchasing history 336), (b) her profile 332 indicates a strong interest in this type of service, (c) she is watching media content related to the services that this business offers, and (d) tracking system 204 was recently notified by this particular business that time-sensitive offers are available (an attempt by this business to elevate its status or visibility among competitors). Focusing on and selecting the compact will lead to a more detailed advertisement which states that a haircut, manicure or makeup application will be 25% off if the appointment is made for this afternoon.

3D object 704 is a complex advertisement that is rendered dynamically. 3D object 704 is a composite of rendered 3D elements such as a mirrored makeup compact 706 and a lipstick 708, and pre-produced elements such as a looping video clip and audio voiceover track. The looping video clip is displayed in the lower mirror, referenced 710, while a partial reflection 712 of the video clip is displayed in the upper mirror. The advertiser data includes not only the code for determining size, color, texture, text and type of model to build and animate, but also the looping video clip and audio voiceover track. The video is incorporated into the 3D object as an animated texture map and synchronized to the moving images.

A 3D object 714 is an advertisement from a garage that winter tires are on sale. Tracking system 204 has been triggered to present this advertisement, which is relevant to the father, because various tracked information monitored by tracking system 204 has been evaluated and found to exceed the relevancy threshold: (a) the father's purchase history indicates that five years ago, he bought tires that are supposed to last 50,000 miles—statistically, these tires must be replaced now, and (b) the father's purchase history indicates that he does business with this garage.

Figure 8:
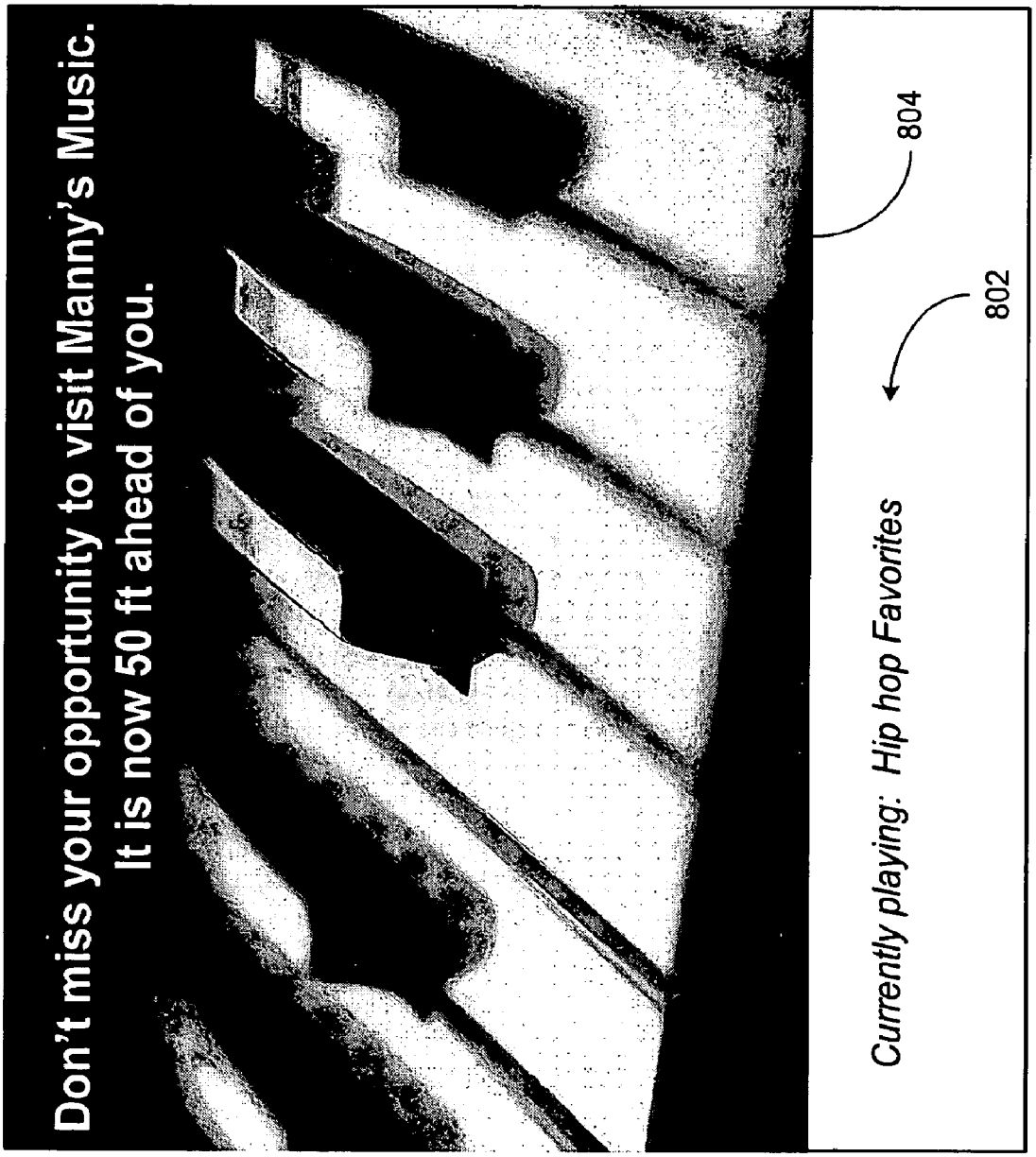
FIG. 8 is an illustration of yet another example view of a display.

FIG. 8 is an illustration of yet another example view of a display. This display is in a mobile device that has location information. In this example, the person using the mobile device and viewing its display enjoys music. A portion 802 of the display shows which music is currently being played on the device. A 3D object 804 is an advertisement for a music store. Tracking system 204 has been triggered to present this advertisement because the weighted combination of the following tracked information monitored by tracking system 204 has been evaluated and found to exceed the relevancy threshold: (a) the person's strong interest in music (as expressed in profile 332), (b) the current location of the mobile device (location 316), and (c) the person's purchasing history 336 indicates frequent purchases at music stores, although not at Manny's Music, since this is the person's first visit to the city where Manny's Music is located.

Figure 9:
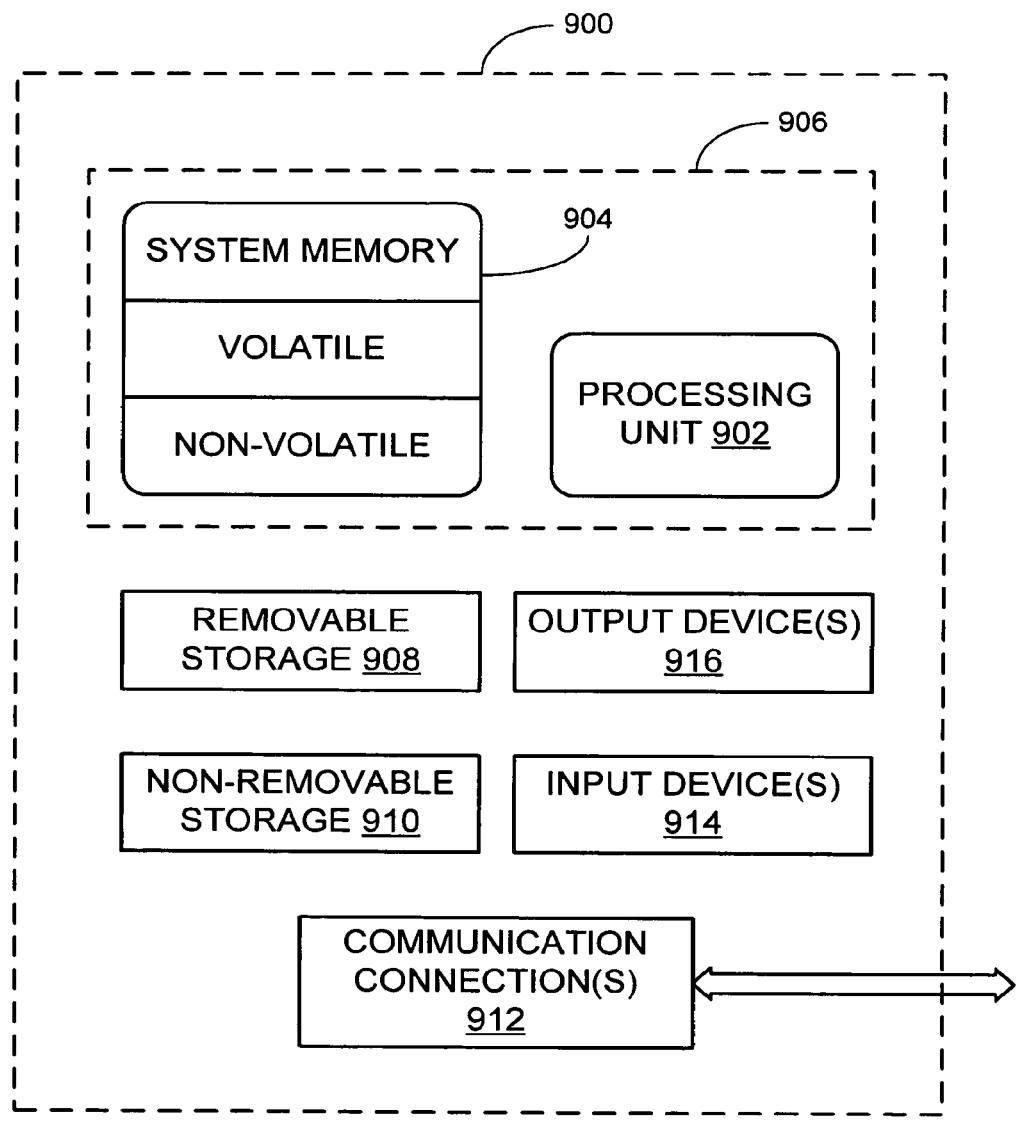
FIG. 9 is an illustration of an exemplary system for implementing embodiments of the invention, the system including one or more computing devices.

FIG. 9 is an illustration of an exemplary system for implementing embodiments of the invention, the system including one or more computing devices, such as computing device 900. Devices 106 and 116, server 112 and device 108 are all computing devices. In its most basic configuration, device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.) or some combination of the two. This most basic configuration is illustrated in FIG. 9 by dashed line 906.

Additionally, device 900 may also have additional features or functionality. For example, device 900 may also include additional storage (removable and/or non-removable) including, but not limited to, magnetic or optical disks or tape. Such additional storage is illustrated in FIG. 9 by removable storage 908 and non-removable storage 910.

Computer storage media includes volatile and nonvolatile, removable and non-removable media implemented in any method or technology for storage of information such as computer readable instructions, data structures, program modules or other data. Memory 904, removable storage 908 and non-removable storage 910 are all examples of computer storage media. Computer storage media includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900.

Device 900 may also contain communication connection(s) 912 that allow the device to communicate with other devices. Communication connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. The term computer readable media as used herein includes both storage media and communication media.

Device 900 may also have input device(s) 914 such as keyboard, mouse, pen, voice input device, touch input device, etc. Output device(s) 916 such as a display, speakers, printer, etc. may also be included. All these devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for advertising comprising:
using a processing unit, identifying a person who is currently viewing a display of a device;
determining that an opportunity exists to present an advertisement that is relevant to said person in the context of said person currently viewing said display;
receiving advertiser data for said advertisement from an advertiser;
using the processing unit, generating additional data for said advertisement to personalize said advertisement based on information that is not accessible by said advertiser;
determining instructions for generating said advertisement in a manner that is configured for imminent presentation in said display; and
providing said advertiser data, said additional data and said instructions to a system coupled to said display, where said system is to synthesize said advertisement dynamically from said advertiser data, said additional data and said instructions.

2. The method of claim 1, further comprising:
notifying said advertiser of said opportunity without identifying said person to said advertiser.

3. The method of claim 1, wherein said additional data elements include personal information of said person.

4. The method of claim 1, wherein determining that said opportunity exists comprises:
collecting and monitoring tracked information; and
evaluating said tracked information in said context.

5. The method of claim 4, the tracked information comprising logistical information associated with characteristics of said display.

6. The method of claim 4, the tracked information comprising content information regarding media content currently being viewed by said person on said display.

7. The method of claim 4, the tracked information comprising viewer information regarding said person.

8. A method for advertising comprising:
using a processing unit, identifying a person who is currently viewing a display;
determining that an opportunity exists to present an advertisement that is relevant to said person in the context of said person currently viewing said display;
receiving from an advertiser data from which at least one three-dimensional object can be rendered;
determining instructions for generating an advertisement that is configured for imminent presentation in said display and that includes said at least one three-dimensional object;
providing said data and said instructions to a three-dimensional rendering engine that is coupled to said display;
using the processing unit, generating additional data for said advertisement to personalize said advertisement based on information that is not accessible by said advertiser;
providing said additional data to said three-dimensional rendering engine.

9. The method of claim 8, further comprising:
notifying said advertiser of said opportunity without identifying said person to said advertiser.

10. The method of claim 8, further comprising:
receiving from said advertiser pre-produced elements for inclusion in said advertisement; and
providing said elements to said three-dimensional rendering engine.

11. The method of claim 8, wherein said additional data elements include personal information of said person.

12. The method of claim 8, wherein determining that said opportunity exists comprises:
collecting and monitoring tracked information; and
evaluating said tracked information in said context.

13. The method of claim 12, the tracked information comprising logistical information associated with characteristics of said display.

14. The method of claim 12, the tracked information comprising content information regarding media content currently being viewed by said person on said display.

15. The method of claim 12, the tracked information comprising viewer information regarding said person.

16. An advertising system comprising:
a tracking system to collect and monitor tracked information and to receive an identification of a person currently viewing a display, to determine therefrom whether an opportunity exists to present an advertisement to said person that is relevant in the context of said person viewing said display, and if so, to notifying an advertiser of said opportunity without identifying said person to said advertiser, and, to dynamically compile data for said advertisement and instructions for generating said advertisement so that said advertisement is configured for imminent presentation in said display including additional data for said advertisement based on information that is not accessible by said advertiser; and
an advertisement synthesis system coupled to said display, said advertisement synthesis system to synthesize dynamically said advertisement from said data and said instructions.

17. The advertising system of claim 16, wherein said advertisement synthesis system comprises a three-dimensional rendering engine.

18. The advertising system of claim 16, wherein said advertisement synthesis system and said display are comprised in a device.

19. The advertising system of claim 16, wherein said device further comprises said tracking system.

20. The advertising system of claim 17, wherein a device comprises said tracking system and said advertisement synthesis system.

* * * * *